US010283021B1

(12) United States Patent
Hartman

(10) Patent No.: US 10,283,021 B1
(45) **Date of Patent: *May 7, 2019**

(54) SIGN HOLDER

(71) Applicant: Jeffrey K. Hartman, Bettendorf, IA (US)

(72) Inventor: Jeffrey K. Hartman, Bettendorf, IA (US)

(73) Assignee: Spring Steel Stands Inc., Bettendorf, IA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/446,900

(22) Filed: Mar. 1, 2017

Related U.S. Application Data

(63) Continuation-in-part of application No. 14/993,033, filed on Jan. 11, 2016, now Pat. No. 9,620,036, which is a continuation of application No. 13/937,115, filed on Jul. 8, 2013, now Pat. No. 9,275,563, and a continuation-in-part of application No. 12/365,504, filed on Feb. 4, 2009, now abandoned.

(60) Provisional application No. 62/301,561, filed on Feb. 26, 2016, provisional application No. 61/817,456, filed on Apr. 30, 2013, provisional application No. 61/063,746, filed on Feb. 5, 2008.

(51) Int. Cl.
*F16M 13/00* (2006.01)
*G09F 15/00* (2006.01)

(52) U.S. Cl.
CPC .......... *G09F 15/00* (2013.01); *G09F 15/0012* (2013.01); *G09F 15/0018* (2013.01)

(58) Field of Classification Search
CPC ............... G09F 7/18; G09F 15/00; G09F 7/00
USPC ............. 40/606.01, 607.03, 607.05; 248/156
See application file for complete search history.

(56) References Cited

U.S. PATENT DOCUMENTS 4,103,445 A * 8/1978 Smith ....................... G09F 7/00 160/378
4,658,527 A * 4/1987 Pingel ....................... G09F 7/22 40/493
4,660,310 A * 4/1987 Farmer ............... G09F 15/0006 40/606.18
4,894,937 A * 1/1990 Davis ....................... G09F 7/18 248/248
4,910,902 A * 3/1990 Anderson ................. G09F 7/18 248/156
4,913,389 A * 4/1990 McCracken ........... F16M 11/22 248/156
5,042,183 A * 8/1991 Kennedy ................... G09F 7/18 248/156
5,103,582 A * 4/1992 Farmer ................... G09F 15/00 40/607.03
5,207,402 A * 5/1993 Berry-Tremmel ........ G09F 7/18 248/156

(Continued)

*Primary Examiner* — Shin H Kim
(74) *Attorney, Agent, or Firm* — Hamilton IP Law, PC; Jay R. Hamilton; Charles A. Damschen

(57) ABSTRACT

A sign holder includes a pair of upright posts, each having a lower ground engaging end and an upwardly disposed portion having a serpentine area with a plurality of bend areas leading to an upper end which is not aligned with the lower end. A relatively thicker transverse member joins the upright posts such that the upper ends thereof are spaced farther apart than the lower ends thereof. The lower cross member positioned as a transverse member may constructed of wire or as a flat blade like member.

14 Claims, 8 Drawing Sheets

(56) References Cited

U.S. PATENT DOCUMENTS 5,307,580 A * 5/1994 Farmer ..................... G09F 7/18 248/156
5,595,010 A * 1/1997 Fuller ................. G09F 15/0025 248/156
5,878,517 A * 3/1999 Gill ........................... G09F 7/12 248/156
6,085,452 A * 7/2000 Davis ..................... G01C 15/06 116/209
6,170,183 B1 * 1/2001 Keefe ................. G09F 15/0006 248/156
6,370,803 B1 * 4/2002 Burquest ............. G09F 15/0025 40/607.04
6,547,204 B1 * 4/2003 Peck ......................... G09F 7/18 248/545
7,437,844 B1 * 10/2008 Kennedy ................. G09F 15/00 248/156
7,681,348 B1 * 3/2010 Saylor ....................... G09F 7/20 116/174
D642,220 S * 7/2011 Moshluk ........................ D20/43
9,620,036 B1 * 4/2017 Hartman ................... G09F 7/18
2005/0039363 A1 * 2/2005 Galey ..................... G09F 15/00 40/607.03
2005/0076552 A1 * 4/2005 Tolna .................. G09F 15/0056 40/607.03
2005/0077441 A1 * 4/2005 Coverstone ............... A45F 3/44 248/156
2006/0059750 A1 * 3/2006 Schwat ..................... G09F 1/06 40/607.03
2007/0039219 A1 * 2/2007 Wallace .................... G09F 3/12 40/645
2007/0062086 A1 * 3/2007 Hamel ...................... G09F 7/00 40/605
2010/0031546 A1 * 2/2010 Nwatu ................ G09F 15/0062 40/607.1
2010/0058635 A1 * 3/2010 Knapp ................ G09F 15/0056 40/607.01
2014/0075797 A1 * 3/2014 Urbina .................... G09F 17/00 40/607.01

* cited by examiner

SIGN HOLDER

CROSS REFERENCE TO RELATED APPLICATIONS

Applicant states that this utility patent application is a continuation-in part of and claims priority from U.S. patent application Ser. No. 14/993,033 filed on Jan. 11, 2016 which was a continuation of and claimed priority from U.S. patent application Ser. No. 13/937,115 filed on Jul. 8, 2013, now U.S. Pat. No. 9,275,563, which was a continuation-in-part of and claimed priority from U.S. patent application Ser. No. 12/365,504 filed on Feb. 4, 2009, which claimed priority under 35 U.S.C. 119(e) from provisional U.S. Pat. App. No. 61/063,746, filed Feb. 5, 2008. Applicant states U.S. patent application Ser. No. 13/937,115 filed on Jul. 8, 2013 also claimed priority under 35 U.S.C. 119(e) from provisional U.S. Pat. App. No. 61/817,456 filed on Apr. 30, 2013. Applicant also claims priority under 35 U.S.C. 119(e) from provisional U.S. Pat. App. No. 62/301,561 filed on Feb. 29, 2016, all of which are incorporated by reference herein in their entireties.

FIELD OF THE INVENTION

The present invention relates to a sign holder. More specifically, the invention relates to wire frame sign holders, such as employed for yard signs.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (d)(c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

DETAILED DESCRIPTION—BRIEF DESCRIPTION OF DRAWINGS

FIG. 5A is a profiled view of the improved cross member of the stout stand as shown at FIG. 5 on the lower position therein.

FIG. 5B is another profiled view of the improved cross member of the stout stand as shown at FIG. 5 therein.

FIG. 5C is a profiled view of the flat cross member of the stout stand positioned in the lower position therein.

FIG. 6A is a profiled view of the improved cross member of the ground buster positioned in the lower position therein.

FIG. 6B is a profiled view of the flat cross member of the ground buster positioned as described therein.

DETAILED DESCRIPTION—LISTING OF ELEMENTS

| Element Description | Element Number |
|---|---|
| Sign holder | 10 |
| Ground | 11 |
| Sign | 12 |
| Upper Portion | 13 |
| Posts | 14 |
| Upper end | 15 |
| Upper post length | 16 |
| Upper portion of upper post length | 16a |
| Lower portion of upper post length | 16b |
| First end of upper post | 16c |
| Second end of upper post | 16d |
| Serpentine area | 17 |
| First bend (radius area) | 18 |
| Second bend (radius area) | 19 |
| Transition lengths | 20 |
| Lower length | 21 |
| Lower end | 22 |
| First Transverse member | 23 |
| Second Transverse member | 24 |
| Threaded male ends | 25 |
| Threaded couplings | 26 |
| Lower Portion | 27 |
| | 28 |
| Lobe | 29 |
| Connection | 30 |
| Upper connection | 30a |
| Lower connection | 30b |
| Cross member | 40 |

DETAILED DESCRIPTION OF INVENTION

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as “first”, “second”, and “third” are used herein and in the appended claims for purposes of description and are not intended to indicate or imply relative importance or significance.

The following detailed description is of the best currently contemplated modes of carrying out illustrative embodiments of the invention. The description is not to be taken in a limiting sense, but is made merely for the purpose of illustrating the general principles of the invention, since the scope of the invention is best defined by the appending claims. Various inventive features are described below herein that can each be used independently of one another or in combination with other features.

Illustrative Embodiment and Advantages of Invention

A holder includes a pair of upright posts, each having a lower ground engaging end and an upwardly disposed portion having a serpentine area with at least first and second bend areas leading to an upper end which is not aligned with the lower end. A relatively thicker transverse member joins the upright posts such that the upper ends thereof are spaced farther apart than the lower ends thereof.

DETAILED DESCRIPTION OF THE INVENTION

Figure 1:
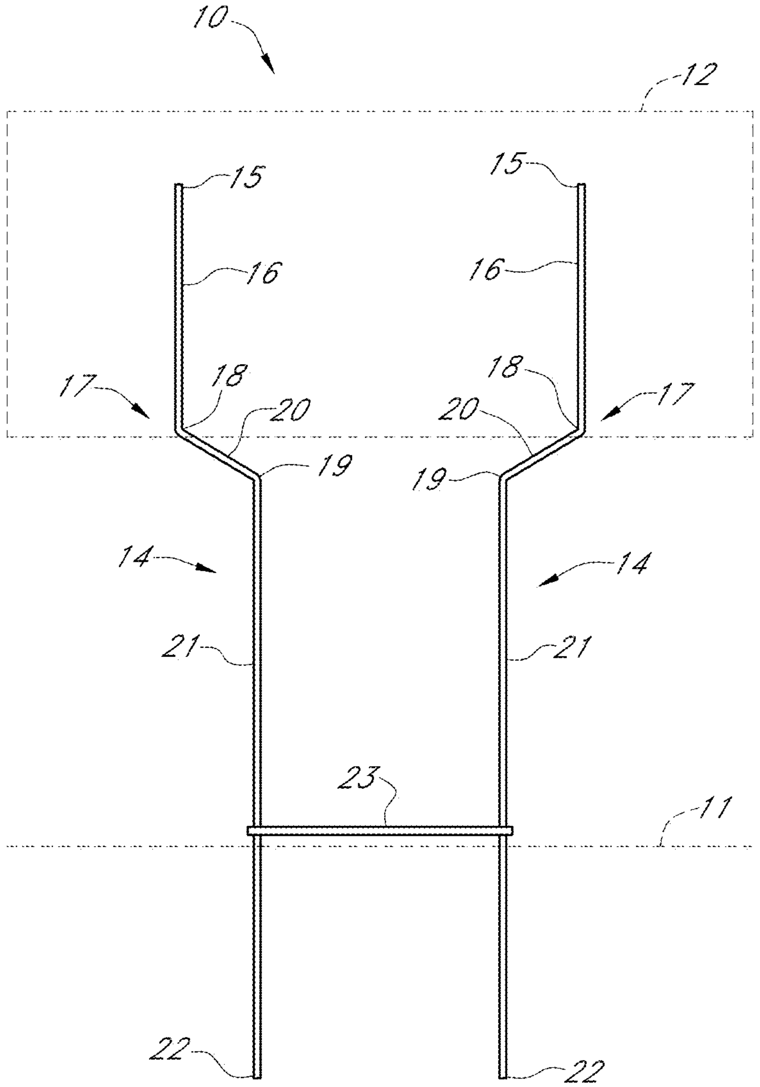
FIG. 1 is a front, elevational view of one embodiment of the sign holder described herein.
Figure 1A:
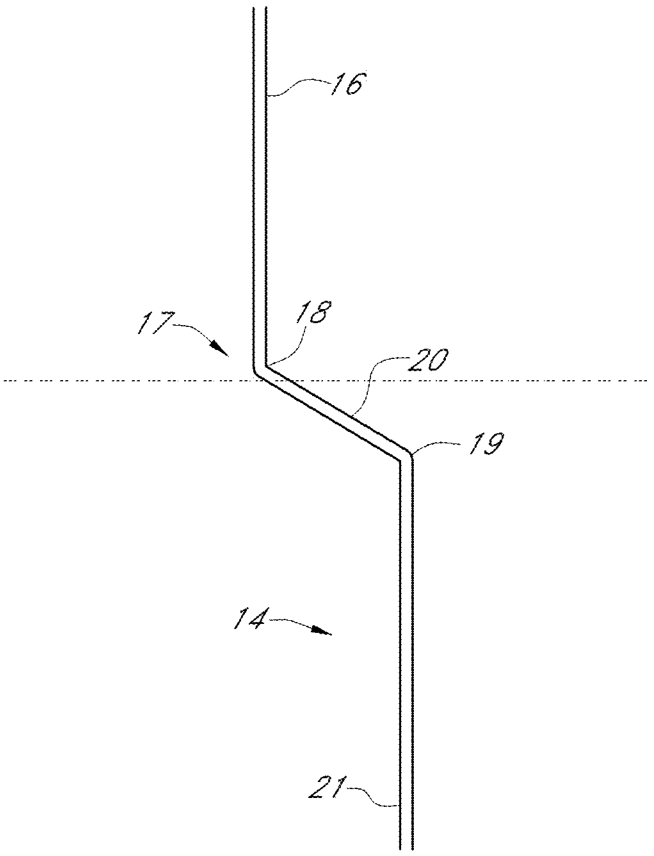
FIG. 1A is a detailed view of one embodiment of the serpentine area (17) defined by and between upper end (15) and lower length (21) of the embodiment of FIG. 1.

Referring now to the drawings, wherein like reference numerals designate identical or corresponding parts throughout the several views, FIG. 1 shows the sign holder of this invention generally at (10). The sign holder (10) engages the ground (11) and supports the sign (12) spaced apart from the ground (11). The sign holder (10) more specifically includes a pair of posts (14). Each post terminates at an upper end (15). An upper post length (16) extends from upper end to a serpentine area (17) including a first bend or radius area (18), a second bend or radius area (19), and a transition length (20) extending between said areas (18, 19). A lower length (21) extends from second radius area (19) to a lower end (22). Optionally, the serpentine area (17) may include additional bend or radius areas and transition lengths. As illustrated by FIG. 1A, serpentine area (17) defines a curving, or repeatedly curving shape, in alternate directions, between upper post length (16) and lower length (21) of the embodiment of FIG. 1 via first bend or radius area (18), transition length (20) and second bend or radius area (19).

A transverse member (23) connects the posts (14). More specifically, the transverse member (23) is disposed downwardly from second radius area (19), toward, and relatively closer to, the lower ends (22) and extends from the lower length (21) of one post (14) to the lower length (21) of the other post (14).

The posts (14) are joined such that the upper post lengths (16), transition lengths (20) and depending lengths (21) are co-planar. The transition lengths (20) extend away from each other such that the upper post lengths (16) are more widely separated than the depending lengths (21). See FIG. 1A for further illustration.

When used, the lower ends (22) of posts (14) are positioned to engage the ground such that the posts (14) are substantially perpendicular to the ground (11). The user then presses on transverse member (23) to drive the lower lengths (21) into the ground up to the level of the transverse member (23). The sign (12) is positioned against the upper ends (15) then pushed downwardly onto the upper post lengths (16). In the alternative, the sign (12) may be positioned on the sign holder (10) prior to insertion into the ground (11). Typically the sign (12) is of a corrugated plastic. The post lengths (16) fit into the openings typically formed by the corrugations.

Preferably, the posts (14) are formed from steel wire, preferably from stainless steel, but also from galvanized or bright basic steel. A suitably stiff plastic also may be used. A preferred dimension for the posts (14) is 0.162 inch wire throughout the length thereof, from upper end (15) to lower end (22). The transverse member (23) also preferably is formed from steel wire however, which is heavier. A preferable dimension is 0.188 inch diameter. The first portion of serpentine area (17) formed by post length (16) and transition length (20), at first radius area (18), preferably forms a 120 degree angle opening toward the interior space between the posts (14). The second portion of serpentine area (17), formed by the second radius area (19), formed by transition length (20) and lower length 21, preferably forms a similar 120 degree angle opening toward the exterior of the posts (14).

Preferably, the length from upper ends (15) to first radius area (18), the transition length (20), and the length from second radius area (19) to lower lengths (21) to transverse member (23), and the separation of the lower ends (22) are of similar dimension. In a preferred sign holder (10) the dimension from upper ends (15) to lower ends (22) is twenty-two inches (22"). The spacing between the upper ends (15) is 10 inches. The spacing between the lower lengths (21) is six inches (6"). The relatively heavy gauge employed for the posts (14), together with the bracing afforded by the even heavier gauge transverse member (23) facilitates relatively effortless driving of the sign holder (10) into the ground (11) even during winter conditions wherein the ground is frozen. Further provided is resistance to the inward bending of posts as occurs in common sign holders, thereby facilitating maintenance of the integrity of the sign (12). The adjacent radius areas (18, 19) are of particular importance for facilitating supporting the sign (12) against the wind.

Figure 2:
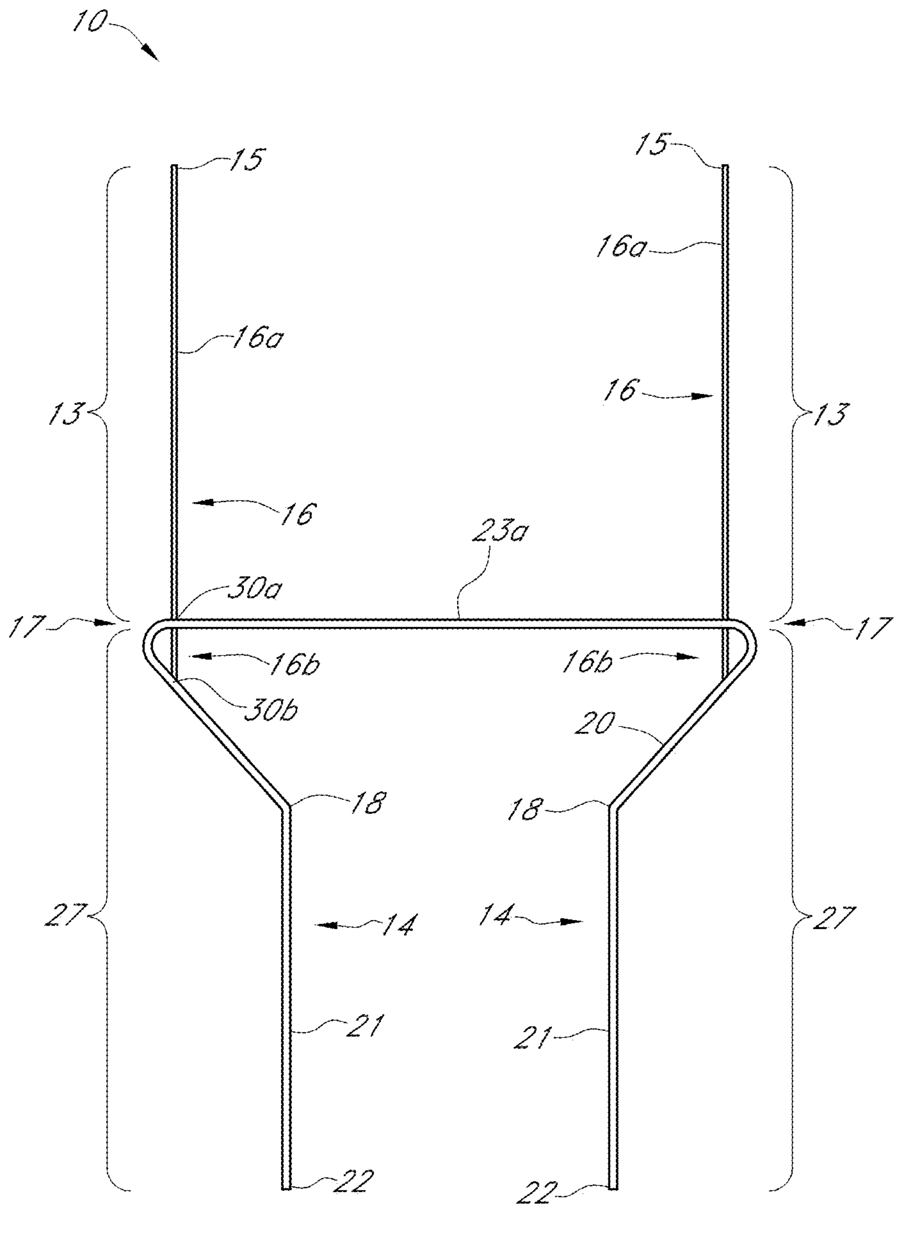
FIG. 2 is a front elevational view of a second embodiment of the sign holder described herein.
Figure 2A:
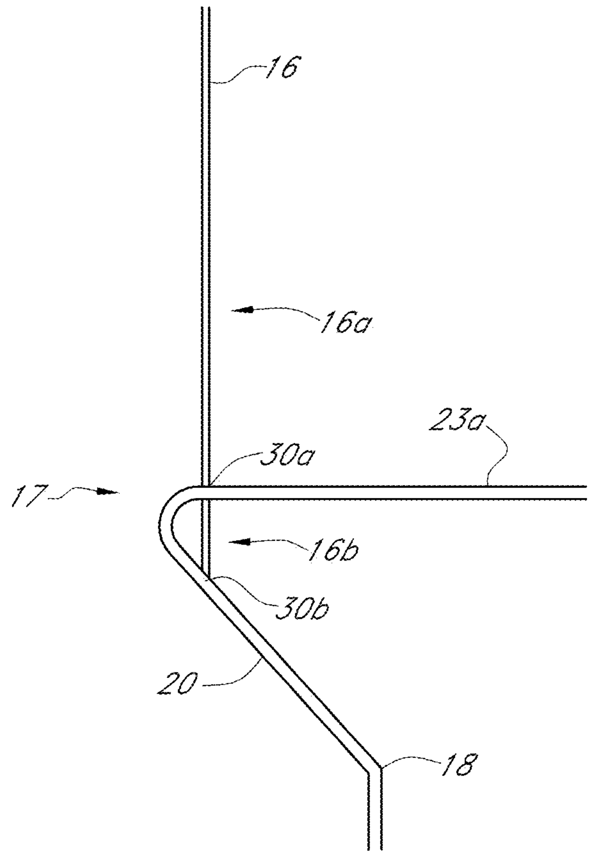
FIG. 2A is a detailed view of another embodiment of the serpentine area (17) defined by and between upper end (15) and lower length (21) of the embodiment of FIG. 2.
Figure 3A:
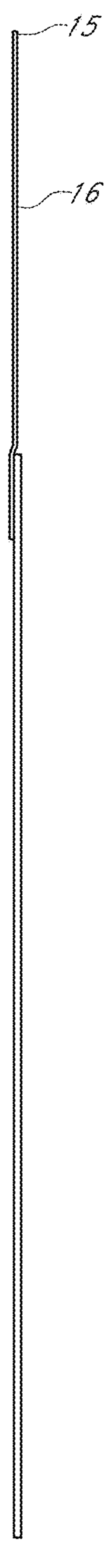
FIG. 3A is a side view of the sign holder of FIG. 3.
Figure 3:
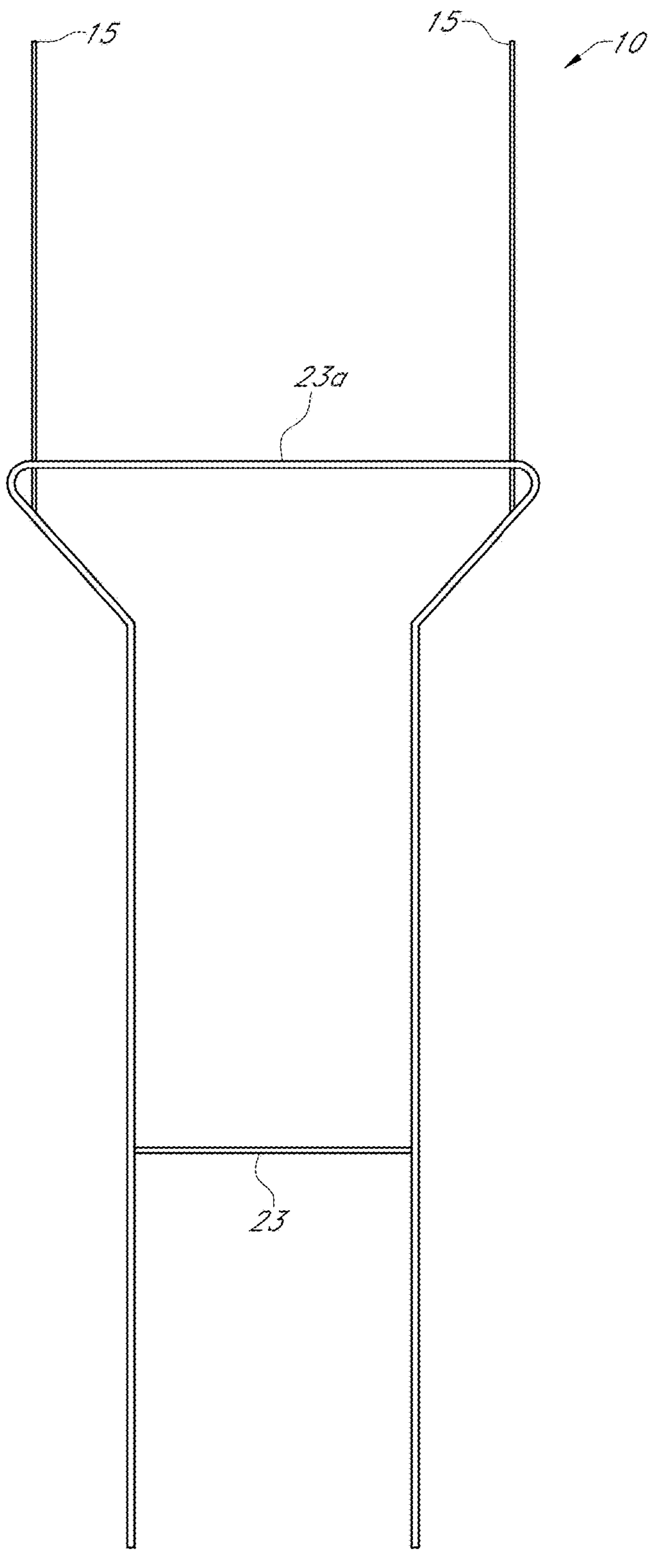
FIG. 3 is a front elevational view of a third embodiment of the sign holder described herein.
Figure 4:
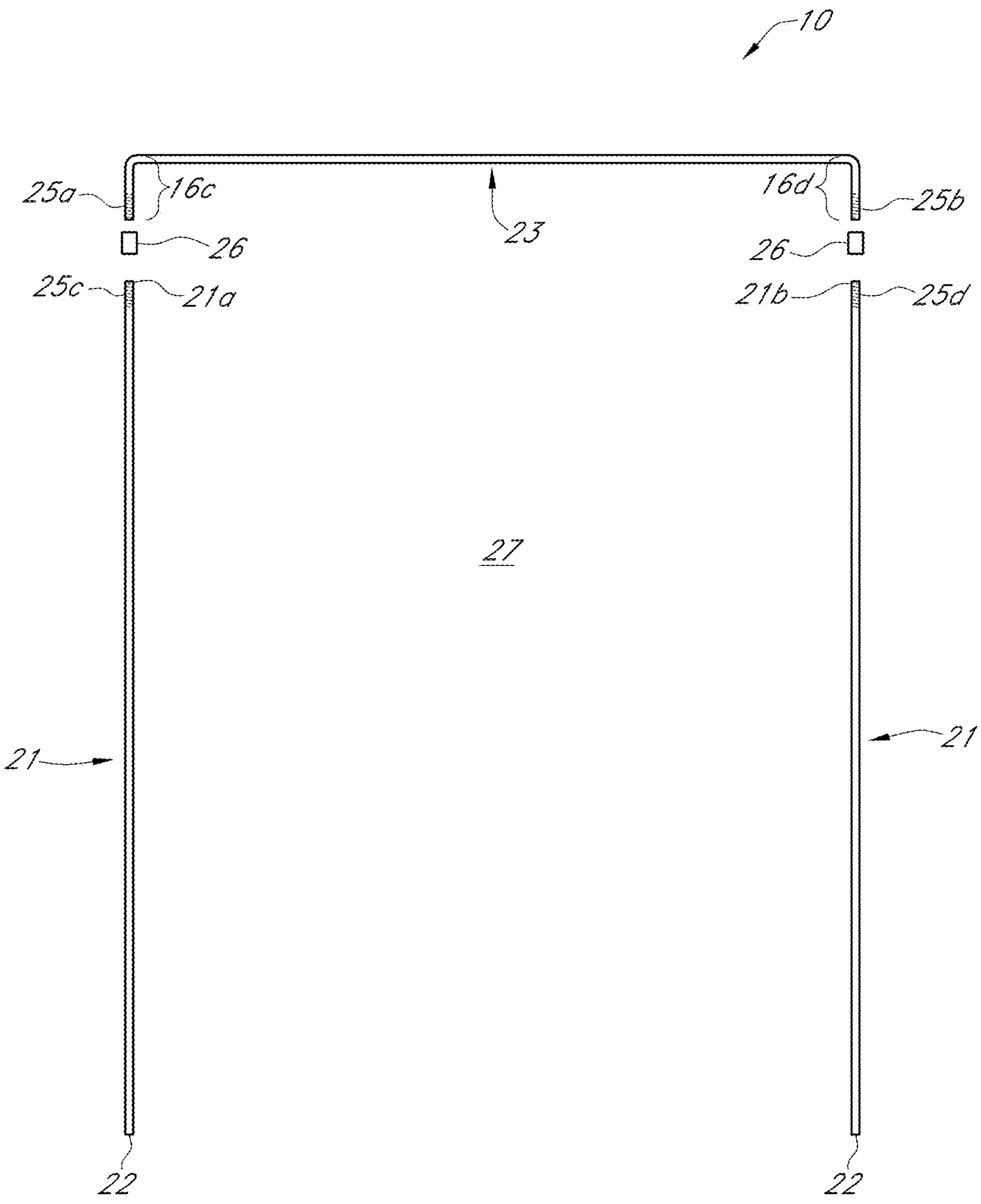
FIG. 4 is a front elevational view of a fourth embodiment of the sign holder described herein.

The embodiments disclosed at FIGS. 2-4 build upon and further improve upon the embodiment of FIG. 1. FIGS. 2 and 2A illustrate another embodiment of the present invention. As shown, the sign holder (10) comprises an upper portion (13) further comprising a pair of upper posts (16) having an upper end (15) and a lower end (16*b*) attached to upper transverse member (23*a*) and transition length (20) at upper and lower connections (30*a*, 30*b*), respectively. A lower portion (27) further comprises an upper transverse member (23*a*) which forms a pair of lower posts (14). Each of the lower posts (14) has an angled portion (18) and a serpentine area (17). The serpentine area (17), as shown in FIGS. 2 and 2A, is a curved portion formed by transverse member (23*a*) and transition length (20). A lobe is formed between the curved portion of the transverse member (23*a*) and the transition length (20) by the lower portion of the upper post length (16*b*). Each of the lower posts (14) has a lower portion (21) extending downwardly from the transverse member (23) and is selectively insertable into the ground at lower end (22). Each post of said pair of upper posts (16) has an upper portion (16*a*) for selectively receiving a sign for display at said upper end (15) of each said post (16). Additionally, the upper posts (16) have a lower portion (16*b*) affixed to the first (upper) transverse member (23*a*) and to the transition length (20), both fore and aft of the serpentine area (17) of post (14). Although in no way limiting, applicant believes spot welding is a suitable method of construction for affixing the upper portion (16*a*) to the transverse member (23*a*) and the transition length 20, at upper and lower connections (30*a*, 30*b*), respectively. Other methods of fabrication including casting may also be used. The sign holder (10) has a full length of eighteen inches (18"). The upper posts (16) are eight inches (8") long and the transverse member(s) (23, 23*a*) is/are eleven inches (11") long. The lower portion (16*b*) affixed to and between the first (upper) transverse member (23*a*) and the transition length (20) is one and a half inches long (1.5"). Although any material may be chosen for construction, applicant believes 4.115 mm diameter galvanized steel is suitable for many applications for the lower post (14) and 3.75 mm diameter galvanized steel is sufficient for the upper post (16).

FIG. 3 illustrates another embodiment of the present invention wherein the embodiment of FIG. 2 has a second transverse member (23) affixed between the lower portion of the posts (14) below the first transverse member (23*a*). The embodiment of FIG. 3 allows for an increased height, as compared to the embodiment of FIG. 2, of the sign holder (10) incorporating the benefits of the strength and rigidity of the present invention. The embodiment disclosed in FIG. 3 has a total height of thirty inches (30") versus the total height of the embodiment disclosed at FIG. 2 of eighteen inches (18"). As one of ordinary skill will appreciate, the foregoing dimensions are by way of illustration only and do not limit the disclosure.

FIG. 4 illustrates another embodiment of the present invention. A sign holder (10) for displaying a sign above a ground surface (11) comprises an upper transverse member portion (23) for selectively receiving a sign (12) for display. The upper transverse member portion (23) further comprises a pair of upper posts (16) having a first and second end (16*c*, 16*d*) with male threads (25*a*, 25*b*). A lower portion selectively insertable into the ground surface (11) also has a pair of posts (21) having a first and second end (21*a*, 21*b*) with first and second threaded ends (25*c*, 25*d*). A pair of threaded couplings (26) affixes the first and second ends of the upper transverse member portion (23) to the first and second ends of the lower portion (21). Although in no way limiting, the posts (21) of the lower portion (27) are typically twenty eight inches (28") in length. The upper transverse member (23) is twenty-four inches (24") in length and post ends (16*c*, 16*d*) are typically two inches (2") in length. Although any material may be chosen for construction, applicant believes 3.75 mm galvanized steel is suitable for many applications. The posts (21) of the lower portion (27) are typically twenty eight inches (28") in length. The industrial applicability of the sign holder (10) is believed to be apparent from the foregoing description.

Figure 5:
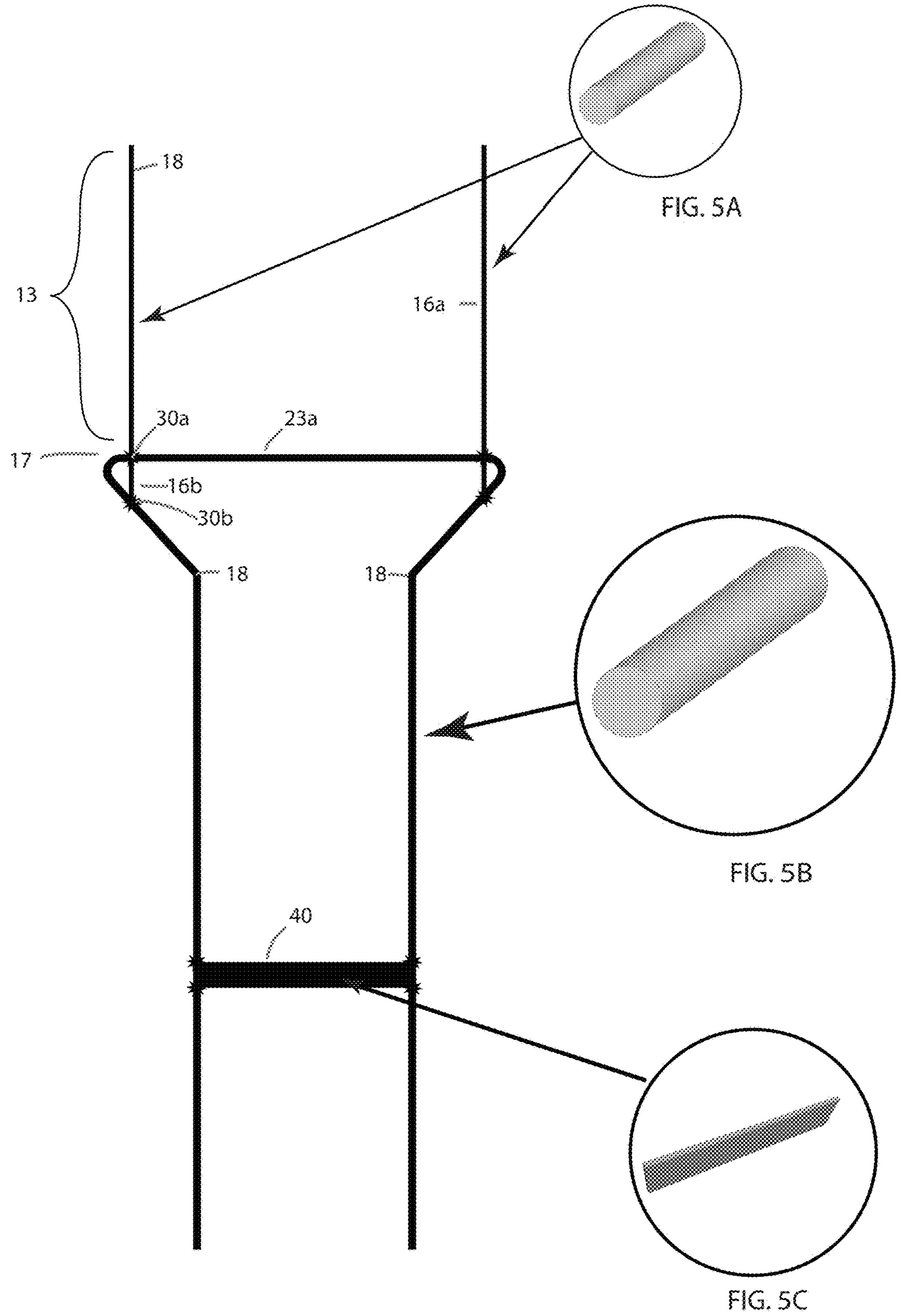
FIG. 5 is a front elevational view of the sign holder as shown at FIG. 3 with an improved cross member positioned in the lower position therein.

FIG. 5 is a front elevational view of the sign holder as shown at FIG. 2 with an improved cross member (40) positioned in the lower position therein. As disclosed by this embodiment of the improved sign holder(s) found herein with a cross member (40) formed as a generally flat plate. During use, the cross member (40) formed as a flat plate has been shown to enhance use-ability as it is stiff and more rigid than a wire cross member having a generally round profile which allows it to punch into or pierce the earth better making it easier to position the sign holder (10). Further, once planted in the soil, the cross member (40) enhances the structural strength of the sign holder improving wind resistance and thereby reducing "sign" wobble. FIG. 5A is a profiled view of the improved cross member of the stout stand as shown at FIG. 5 on the lower position therein. The improved cross member of the stout stand, as shown in FIG. 5A, has a diameter of 3.75 mm. FIG. 5B is another profiled view of the improved cross member of the stout stand as shown at FIG. 5 therein. The improved cross member of the stout stand, as shown in FIG. 5B, has a diameter of 4.115 mm which is structurally supporting the stout stand. FIG. 5C is a profiled view of the flat cross member of the stout stand positioned in the lower position therein. The flat cross member is constructed of having 2 mm thickness, without any limitation or restriction.

Figure 6:
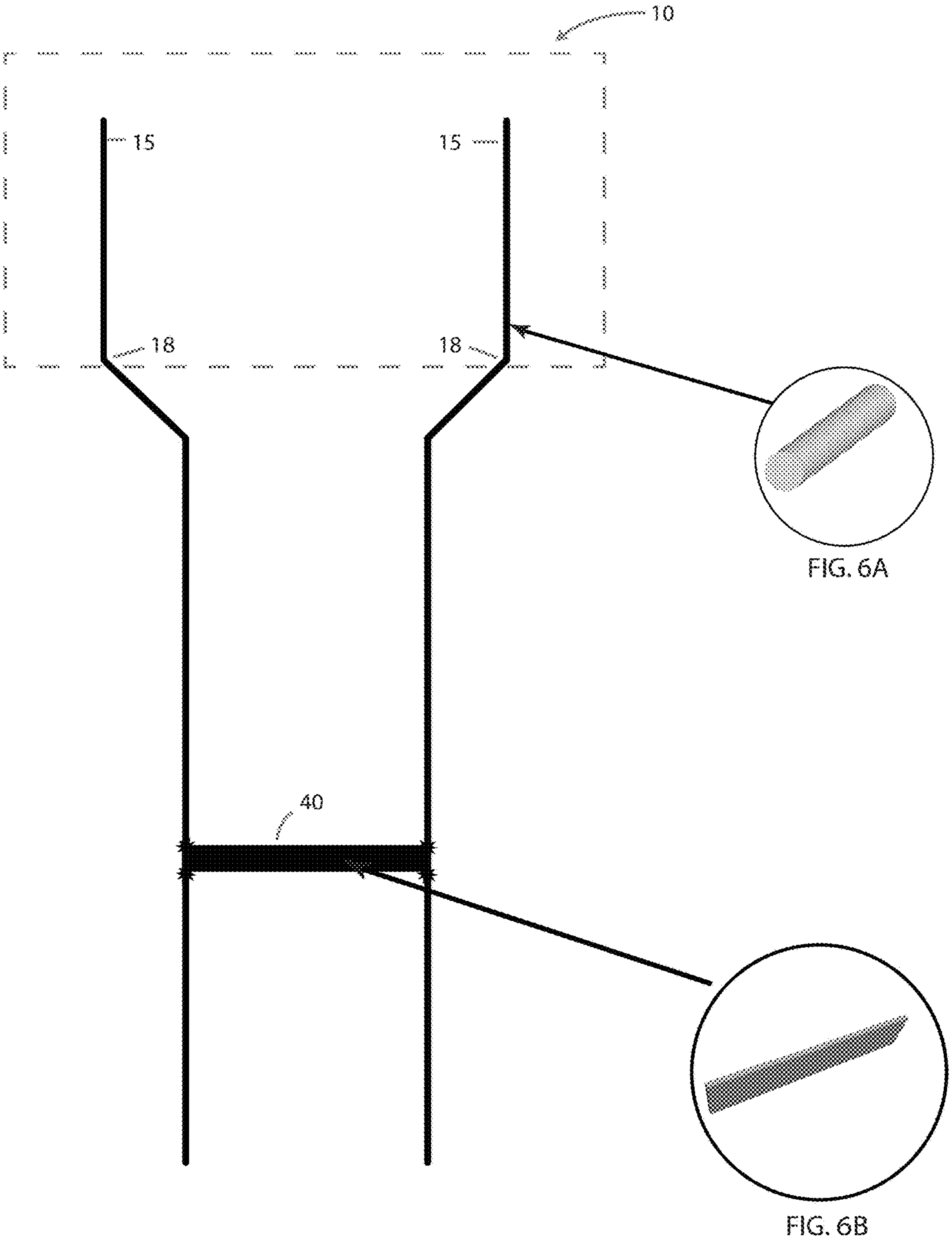
FIG. 6 is a front elevational view of the sign holder as shown at FIG. 1 with an improved cross member positioned in the lower position therein having a flat front profile therein.

FIG. 6 is a front elevational view of the sign holder (10) as shown at FIG. 2 with an improved cross member (40) positioned in the lower position therein and having a relatively flat front profile therein. As shown, the embodiments of the cross member (40) as found in FIGS. 5 and 6 may be fabricated from any material that is suitable for any particular deployment with steel, aluminum, plastic and combinations therein being particularly suitable. FIG. 6A is a profiled view of the improved cross member of the ground buster. The improved cross member of the ground buster has a diameter of 3.75 mm. FIG. 6B is a profiled view of the flat cross member of the ground buster having a 2 mm thickness positioned in the lower position as described therein.

Although only exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. A sign holder, for displaying a sign above a ground surface, comprising:

a) an upper portion, said upper portion comprising a pair of upper posts having a first and second end; and;

b) a lower portion comprising a pair of lower posts having a first end and a second end;

c) a transition portion, said transition portion connecting at a first end to the second end of the upper post and a second end connecting to an upper portion of a lower post to form an angle between the upper post and the lower post;

d) each said post of said pair of lower posts having a lower portion extending downwardly from the transition portion and having a transverse member positioned therein between and connected to each of the lower posts, wherein the second ends of the lower posts are selectively insertable into the ground; and, e) each said post of said pair of upper posts having an upper portion for selectively receiving a sign for display at said second end of each said post.

2. The sign holder of claim 1 wherein either said second transverse member is formed as a flat crossmember having a dimension greater than that of each said posts.

3. The sign holder of claim 2 wherein said upper portion is configured to selectively receive a corrugated sign for display, wherein said corrugated sign has a plurality of corrugations therein suitable for slidable engagement between said upper portion of said upper post lengths and said first transverse member.

4. The sign holder of claim 1 wherein either said first or said second transverse member is formed as a flat blade like member.

5. The sign holder of claim 1 wherein the cross member is formed as a flat plate for rigidity and to improve ground deployment for piercing the earth.

6. The sign holder according to claim 1 wherein a second transverse member is positioned below said first transverse member and affixed to and between each said post of said pair of lower posts having a lower portion extending downwardly from said second transverse member and selectively insertable into the ground.

7. The sign holder of claim 1 wherein the transition portions open toward each other.

8. The sign holder of claim 1 wherein each transition defines a 120° interior angle.

9. The sign holder of claim 1 wherein each post is formed from stainless steel having a diameter of at least 0.162 inches.

10. The holder of claim 1 wherein said transverse member is formed from stainless steel having a diameter greater than that of said posts.

11. The holder of claim 1 wherein said transverse member may constructed as a flat blade like member.

12. The holder of claim 9 wherein said transverse member may constructed as a flat blade like member.

13. The holder of claim 10 wherein said transverse member may constructed as a flat blade like member.

14. The holder of claim 1 wherein said upper, lower and intermediate portions are coplanar.

* * * * *